July 8, 1924. 1,500,686
J. M. SULLIVAN
VALVE
Filed Feb. 21, 1921
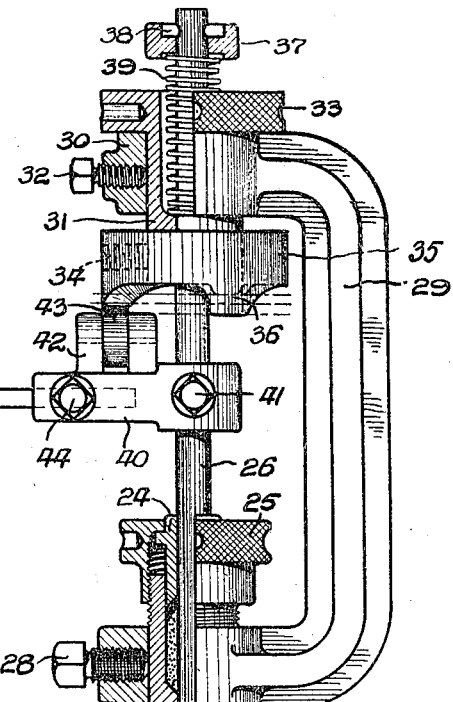
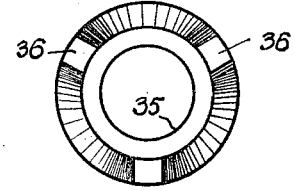
FIG. 2.
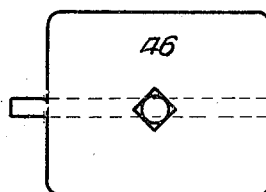
FIG. 3.
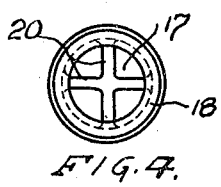
FIG. 4.
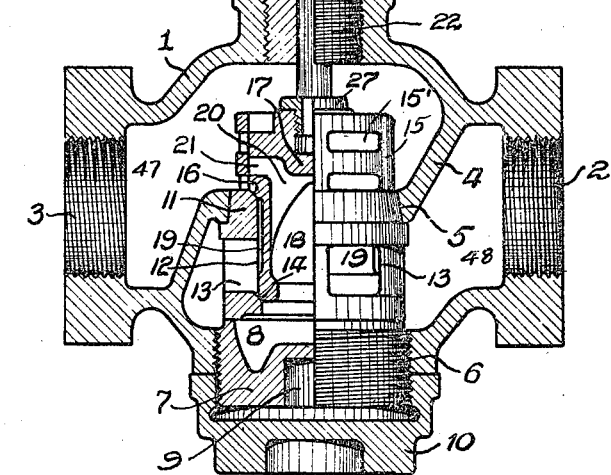
FIG. 1.
Joseph M. Sullivan, Inventor
By [signature]
Attorneys Patented July 8, 1924.

1,500,686

UNITED STATES PATENT OFFICE.

JOSEPH M. SULLIVAN, OF DETROIT, MICHIGAN.

VALVE.

Application filed February 21, 1921. Serial No. 446,832.

*To all whom it may concern:*

Be it known that I, JOSEPH M. SULLIVAN, a citizen of the United States of America, residing at Detroit, in the county of Wayne and State of Michigan, have invented certain new and useful Improvements in Valves, of which the following is a specification, reference being had therein to the accompanying drawings.

This invention relates to a feed water valve for boiler regulators that may be associated with a thermostat, pump and other devices for automatically supplying a boiler with water.

Numerous valves have been used and controlled by thermostats for regulating the supply of water to a boiler, and some of these valves include a series of levers which become coated with scale and in time render the valve inoperative. These same valves often stick and are not at all positive in their operation on account of the construction employed. Then again, the manner of articulating the valve with a thermostat often causes parts of the valve or valve connection to be broken due to an excessive action by the thermostat, with no means of relieving such action except by parts of the valve being broken. Furthermore, such valves often chatter, become worn, and eventually leak so that the valve cannot be positively depended upon as a feed water regulator.

Knowing these and other faults of valves now in use, I have devised a thermostatically operated valve which includes many novel features, the most important of which may be characterized as follows:

First, novel means is employed for causing the valve stem to partially rotate during its adjustment and thus avoid sticking or binding of the valve stem when actuated.

Second, the valve is devoid of levers, links and such parts that may be rendered inoperative by the accumulation of scale or foreign matter.

Third, the valve includes a cage, serving functionally as a guide, to prevent chattering of the valve, besides facilitating grinding and better seating of the valve, these features contributing to a tight valve possessing much greater life than an ordinary regulator valve.

Fourth, the valve, per se, is somewhat in the form of a piston which may be moved by pressure to insure action of the valve without any danger of the same sticking, and the construction entering into the valve may be readily associated with a diaphragm or any suitable means for actuating the valve.

Fifth, the various parts entering into the construction of the valve can be manufactured at a comparatively small cost and easily and quickly assembled.

The construction by which the above and other results are attained will be hereinafter described and then claimed, and reference will now be had to the drawings, wherein—

Figure 1 is a horizontal sectional view of the valve, partly in plan, showing the valve closed;

Fig. 2 is an end view of a cam member adapted to form part of the valve;

Fig. 3 is a side view of a detached arm socket, and

Fig. 4 is an end view of a piston valve.

My valve is used in a horizontal position and comprises a globular valve body 1 having an inlet connection 2 and an outlet connection 3, these connections being in opposed relation with the valve body 1 provided with the usual partition 4 affording chambers 47 and 48. In the partition is a tapering cage seat 5.

One end of the valve body 1 has a large opening 6 with the walls thereof screwthreaded to receive an inner plug 7 which has faces thereof provided with recesses 8 and 9, the former providing clearance at the chamber 48 and the latter being in the form of a socket to permit of a suitable tool being inserted in the inner plug 7 so that the same may be rotated and properly adjusted in the end of the valve body.

Screwed on the outer end of the inner plug 7 is an outer plug or cap 10 which abuts the valve body 1 and serves as a jam or lock nut for securing the inner plug 7 in an adjusted position. Any suitable means may be provided for rotating the outer plug or cap 10.

Mounted in the partition 4 is a tapering portion 11 of a combined valve seat member and cage which abuts one face of the partition 4 and is retained in engagement therewith by the inner plug 7 engaging the end of the cage. That portion of the cage in the chamber 48 has a cylindrical bore 12 communicating with the recess 8 and radially disposed openings 13 so that water, under pressure, at the inlet connection 2 and in the chamber 48 may enter the cage through the side walls thereof.

Adjacent one end of the bore 12 is an annular valve seat 14, and that portion of the valve cage in the chamber 47 has lateral openings 15 while the cage has an annular valve seat 16 substantially in the same plane as the partition 4, and this valve seat is adapted to cooperate with the valve seat 14 in permitting of the valve being positively closed by a piston valve.

The piston valve is designated 15' and has a skirt portion 18 slidable in the bore 12 of the valve cage. The skirt portion 18 has its outer wall provided with an annular groove or channel 19 and one end of said skirt portion 18 is adapted to engage the annular seat 14, at one end of the bore 12. The other end portion of the piston valve is slidable in the other end portion of the cage and is adapted to seat on the annular seat 16 so that the piston valve may close the valve.

In the piston valve are arch shaped webs 20 supporting the end of the piston valve and bracing the skirt 18 thereof to prevent collapse of the piston valve under excessive pressure, and that portion of the piston valve, between the webs 20, has lateral openings 21, adapted to communicate with the endmost lateral openings 15 of the valve cage, and thereby establish communication between the interior of the piston valve and the chamber 47 of the valve body 1. As shown in Fig. 1 the end portion of the piston valve closes the endmost lateral openings 15 of the valve cage, and when the piston valve is unseated, the annular channel 19 of the piston valve skirt establishes communication between the innermost lateral openings 15 and the radially disposed openings 13 of the valve cage, thereby establishing communication between the chambers 47 and 48. At the same time the water in the chamber 48 of the valve body may enter the piston valve and pass through the openings 21 and 15 into the chamber 47 portion of the valve body.

I attach considerable importance to the construction of the piston valve since water, under pressure, may enter the chamber 48 of the valve and assist in unseating it. This prevents sticking or binding during an opening movement of the piston valve. Then again, while the valve is closed, the two valve seats afford a positive closure, and opening of the valve affords a quick and unobstructed communication between the inlet and outlet connections of the valve body. The arch shaped webs 20 fully support the end of the piston valve so that a connection may be made without sacrificing strength and rigidity.

Mounted in the valve body is the inner screwthreaded end of a stuffing box 23 and said stuffing box has the outer end thereof provided with a packing gland 24 which is adjustably held in the stuffing box by a knurled nut or cap 25 screwed on the outer end of the stuffing box 23. It is through the medium of the knurled nut or cap 25 that the gland 24 may be tightened from time to time to compensate for wear, prevent leakage and chattering, besides assuring an even smooth movement of a valve rod 26 extending through the stuffing box into the valve body 1 and connected to the piston valve by a split coupling member 27 or other connecting means.

Mounted on the stuffing box 23 and detachably held thereon by a set screw 28 is a bracket 29, said bracket affording a throat and having its outer end provided with a socket 30. Adjustably mounted in the socket 30 is a barrel 31 held against rotation by a set screw 32 and the outer end of the barrel has a knurled or socket nut 33 so that it may be easily rotated when the screw 32 is loose. Fixed on the inner end of the barrel 31, by a screw 34, is a cam member 35, having a plurality of cams 36 which vary in depth or contour so as to provide a plurality of rises or valleys, the purpose of which will hereinafter appear.

The valve rod 26 extends through the barrel 31 and has its outer end provided with a spring seat washer or member 37 detachably held in place by a transverse pin 38, and encircling the valve rod 26, between the inner end of the barrel 31 and the washer 37, is a coiled expansion spring 39, the expansive force of which tends to shift the valve rod 26 and unseat the piston valve.

Mounted on the valve rod 26, within the throat of the bracket 29, is a socket member 40 which may be adjusted relative to the valve rod and fixed thereon by a set screw 41. The socket member 40 has lugs 42 and rotatable between said lugs is a cam roller 43 which normally bears against one of the cams 36 of the cam member the expansive force of the spring 19 tending to shift the valve rod 26 to valve open position.

Mounted in the socket 40 and retained therein by a set screw 44 is the inner end of a weight arm 45, said weight arm having the outer end thereof provided with an adjustable weight 46 which is adapted to turn the valve rod 26 and maintain the piston valve normally seated against the action of the spring 39, and the weight arm 45 is adapted to be suitably connected to a thermostat or other device by which the arm may be swung upwardly in a plane at a right angle to the axis of the valve. The thermostat or elevating device has not been illustrated for the reason that it forms no part of this invention, but it will be understood that suitable provision is made in connection with the weight arm 45 or the weight 46 for a thermostatic connection.

In operation, the thermostat or other device causing the weight arm 45 to be elevated, causes the piston valve to be unseated. Initial movement of the piston valve admits water under pressure into the inlet end of the piston valve, where the pressure of water against the front of the piston valve assists in unseating the same. As the weight arm 45 is raised the valve rod 26 is partially rotated clockwise and with the roller 43 at the peak of one of the cams 36, said roller will roll down the cam, thus releasing the tension of the spring 39, so that said spring may bodily shift the valve rod 26 and the weight arm 45, thus opening the piston valve. It is the turning action of the valve rod that prevents binding or sticking of said rod in its stuffing box. When the thermostat releases the weight arm 45, said arm turns the valve rod 26 counter-clockwise and with the roller 43 ascending the cam 36, the valve rod 26 is shifted against the action of the spring 29 and the valve closed, thus leaving the spring under tension for opening the valve at the next operation. Since there are a multiplicity of the cams and the cam member 35 is adjustable, it is possible to set the barrel 31 relative to the socket 30 so as to present a desired cam to the cam roller 43. Furthermore, since the cams 36 vary in depth, it is obvious that the opening of the piston valve may be varied. For instance, one cam will allow the piston valve to open just so far, and another cam permit of the valve opening much further. With this adjustment it is possible to regulate the valve to properly serve a boiler with water.

It will be noted that easy access may be had to the valve seat member so that the same may be removed and the valve seats reground, and the same is true of the piston valve and other parts of the entire structure.

It is thought that the utility of my valve will be apparent without further description, and while in the drawings there is illustrated a preferred embodiment of my invention, it will be understood that the structural elements are susceptible to such variations and modifications as fall within the scope of the appended claims.

What I claim is:—

1. A valve comprising a globular body having a partition provided with an opening, a valve cage mounted in the partition opening of said body from one side thereof, and extending to the opposite side of the partition and having lateral openings, a plug in the body against said cage, a cap on said plug against said body and a piston valve adjustable in said cage and normally closing the lateral openings of said valve cage.

2. A valve of the type described comprising a body having chambers, a cage fixed in said body and communicating with the chambers of said body, and a double seating piston valve in said cage, said piston valve being hollow with webs therein supporting an end of said piston valve.

3. A valve as in claim 2, characterized by said piston valve permitting of water under pressure passing outside and inside thereof from one chamber of said body to the other chamber thereof when the valve is open.

4. A valve as in claim 2, characterized by said body having a partition with the cage mounted therein and held in place from one end of said body.

5. A valve body, a piston valve therein, a rod connected to said piston valve, means engaging said rod for opening said piston valve, a cam member supported from said body, and means on said rod engaging said cam member for rotating the valve rod and permitting the opening of the valve when moved in one direction.

6. A valve body, a piston valve normally seated therein and adapted to be unseated, valve unseating means, an arm movable with said piston valve and adapted to be raised to cause partial rotation of said piston valve, and a cam cooperating with said arm in controlling the action of said valve unseating means.

7. A valve having a smooth reciprocable operating rod, means for moving said rod to open said valve, an adjustable cam member about said rod, an arm mounted on said rod and carrying a cam roller for cooperating with said cam member in normally retaining said valve closed, and adapted to be raised to permit of said means opening said valve, said cam roller adapted to cause closing of said valve against the action of said means when said arm is lowered.

8. A valve as in claim 7, characterized by said cam member having a plurality of cams varying in depth and either of which may be presented to said cam roller.

9. A feed water valve for boilers adapted to be operated by a thermostat and comprising a normally seated valve, a valve rod, a spring for unseating said valve, a cam member, and a weighted arm attached to said rod, and cooperating with said cam member in maintaining said valve closed and adapted to be moved by the thermostat to permit said spring to unseat said valve, said arm when moved imparting rotary movement to the rod and valve.

10. A feed water valve as in claim 9, characterized by said valve being constructed so that water under pressure may assist in opening said valve.

In testimony whereof I affix my signature in presence of two witnesses.

JOSEPH M. SULLIVAN.

Witnesses:
ANNA M. DORR,
KARL H. BUTLER.